United States Patent
Frazier et al.

(10) Patent No.: US 9,747,203 B2
(45) Date of Patent: Aug. 29, 2017

(54) MULTI-SECTION GARBAGE COLLECTION SYSTEM INCLUDING MULTI-USE SOURCE REGISTER

(71) Applicant: International Business Machines Corporation, Armonk, NY (US)

(72) Inventors: Giles R. Frazier, Austin, TX (US); Michael Karl Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 45 days.

(21) Appl. No.: 14/974,008

(22) Filed: Dec. 18, 2015

(65) Prior Publication Data
US 2017/0177472 A1 Jun. 22, 2017

(51) Int. Cl.
*G06F 12/02* (2006.01)

(52) U.S. Cl.
CPC .... *G06F 12/0253* (2013.01); *G06F 2212/702* (2013.01)

(58) Field of Classification Search
CPC ............. G06F 12/0269; G06F 12/0253; G06F 12/0261; G06F 12/0276
USPC ............ 711/166, E12.009, E12.01, E12.011, 711/E12.012
See application file for complete search history.

(56) References Cited

U.S. PATENT DOCUMENTS

| | | | |
|---|---|---|---|
| 6,085,289 A | 7/2000 | Thatcher et al. | |
| 7,177,876 B2 | 2/2007 | Sankaran | |
| 7,849,293 B2 | 12/2010 | Blaner et al. | |
| 8,135,915 B2 | 3/2012 | Dimpsey et al. | |
| 2009/0327374 A1* | 12/2009 | Wright | G06F 12/0269 |

OTHER PUBLICATIONS

Bartlett, J., "Assembly language for Power Architecture, Part 2: The art of loading and storing on PowerPC," IBMdeveloperWorks, 2006, available: http://www.ibm.com/developerworks/library/l-powasm2/.*

(Continued)

*Primary Examiner* — Ann J Lo
*Assistant Examiner* — Tracy A Warren
(74) *Attorney, Agent, or Firm* — Cantor Colburn LLP; William A. Kinnaman, Jr.

(57) ABSTRACT

A computer system is configured to perform a garbage collection process within a computing environment. The computer system includes a memory having a load-monitored region managed by a runtime environment. A computer processor is configured to perform operations including executing an instruction to load a doubleword, where the instruction includes a destination register. The operations further include loading into the destination register a pointer address of a pointer when the pointer indicated by the instruction points to a first location located in the load-monitored region. The operations further include invoking a garbage collection event-based branch (EBB) in response to reading the pointer address from the destination register. In response to invoking the garbage collection EBB, an object indicated by the pointer address is moved via a handler from the first location in memory to a second location in memory that is located outside of the load-monitored region.

20 Claims, 13 Drawing Sheets

(56) References Cited

OTHER PUBLICATIONS

Frazier et al., "Multi-Section Garbage Collection System Including Real-Time Garbage Collection Scheduling", U.S. Appl. No. 14/972,604, filed Dec. 17, 2015.
Frazier et al., "Multi-Section Garbage Collection System Including Shared Performance Monitor Register", U.S. Appl. No. 14/972,345, filed Dec. 17, 2015.
List of IBM Patents or Patent Applications Treated as Related; (Appendix P), Filed Jan. 8, 2016; 2 pages.
"Event-Based Branch Facility", IBM, Power ISA, Version 2.07B, Chapter 7, Apr. 9, 2015, pp. 817-820.
Cohen, "Reversing the Order of Bytes in a Doubleword using Four Power Personal Computer Instructions", IBM Technical Disclosure Bulletin, vol. 38, No. 9, Sep. 1995, pp. 509-510.
McDaniel, "An Analysis of a Mesa Instruction Set", Xerox Palo Alto Research Center, Jun. 1982, pp. 1-16.
Siebert, "Concurrent, Parallel, Real-Time Garbage-Collection", ISMM'10, Jun. 5-6, 2010, ACM, 2010, pp. 1-10.
Weiss, "Garbage Collectors—Serial vs. Parallel vs. CMS vs. G1 (and what's new in Java 8)", Takipi Inc., Sep. 3, 2014, pp. 1-9 (accessed from http://blog.takipi.com/garbage-collectors-serial-vs-parallel-vs-cms-vs-the-g1-and-whats-new-in-java-8/).

* cited by examiner

MULTI-SECTION GARBAGE COLLECTION SYSTEM INCLUDING MULTI-USE SOURCE REGISTER

BACKGROUND

Various non-limiting embodiments described herein relate generally to computer memory management, and more specifically, to a multi-section garbage collection system.

Garbage collection is an automatic memory management process that identifies objects in memory that are no longer being referenced and frees those objects. As memory objects of varying sizes are allocated and later freed, the memory in which they are stored becomes increasingly fragmented. Eventually, very few large free areas of memory exist, and it becomes difficult to store additional objects without increasing the memory size. When this occurs, a process within garbage collection, referred to as compaction, is employed in order to consolidate the allocated objects into one large area, leaving another large area of free space available for new objects. During consolidation, the memory objects that are still being referenced are moved from one area of memory to another area of memory.

Conventionally, when garbage collection is performed on an object storage area, applications using the object storage area are required to pause or halt execution. One reason for this is to determine whether the pointers to the objects used by the applications to access the objects are still valid, since the objects may have moved. These pauses, occasionally several seconds long, prevent the applications from being used for time-sensitive tasks, such as transaction processing, real-time games, or mechanical control. Thus, a need exists for an optimized garbage collection process.

SUMMARY

According to a non-limiting embodiment, a computer system is configured to perform a garbage collection process within a computing environment. The computer system includes a memory having a load-monitored region managed by a runtime environment. A computer processor is configured to perform operations including executing an instruction to load a doubleword, where the instruction includes a destination register. The operations further include loading into the destination register an address of a pointer when the pointer indicated by the instruction points to a first location in the load-monitored region. The operations further include invoking a garbage collection event-based branch (EBB) in response to loading the address of the pointer into the destination register. In response to invoking the garbage collection EBB, an object indicated by the pointer address is moved via a handler from the first location in memory to a second location in memory that is located outside of the load-monitored region.

According to another non-limiting embodiment, a method of managing a memory unit comprises designating a load-monitored region in the memory unit, and executing an instruction to load a doubleword, the instruction including a destination register. The method further includes loading into the destination register an address of a pointer when the pointer indicated by the instruction points to a first location in the load-monitored region. The method further includes invoking a garbage collection event-based branch (EBB) in response to loading the address of the pointer into the destination register, and in response to invoking the garbage collection EBB, moving an object indicated by the pointer address with a handler from the first location in memory to a second location in memory that is located outside of the load-monitored region.

According to still another non-limiting embodiment, a computer program product manages a memory unit. The computer program product comprises a computer readable storage medium having program instructions embodied therewith. The program instructions are executable by an electronic computer processor to perform operations comprising designating a load-monitored region in the memory unit, and executing an instruction to load a doubleword, the instruction including a destination register. The operations further include loading into the destination register an address of a pointer when the pointer indicated by the instruction points to a first location in the load-monitored region, and invoking a garbage collection event-based branch (EBB) in response to loading the address of the pointer into the destination register. In response to invoking the garbage collection EBB, the operations include moving an object indicated by the pointer address with a handler from the first location in memory to a second location in memory that is located outside of the load-monitored region Additional features are realized through the techniques of the present invention. Other embodiments are described in detail herein and are considered a part of the claimed invention. For a better understanding of the invention with the features, refer to the description and to the drawings.

DETAILED DESCRIPTION

In accordance with one or more non-limiting embodiments, a capability is provided for an optimized garbage collection process that advantageously improves application performance, improves performance of the processor executing the application, and/or improves performance of the computing environment in which the processor executes.

The optimized garbage collection process allows applications (also referred to as programs) that are accessing objects in an area of memory not undergoing garbage collection to continue processing during garbage collection without interruption, allows applications accessing objects in an area of memory being garbage collected to continue processing after a very short unnoticeable delay, and further improves the handling of the object pointers (also referred to as pointers). An instruction, referred to as a load monitored doubleword indexed (ldmx) instruction, may be provided and used whenever an application accesses a pointer to an object in memory. When such an instruction accesses a pointer that indicates an object that lies within a given address range, the processor causes an asynchronous branch (referred to as an Event-Based Branch (EBB)) to a pointer update handler (also referred to as a garbage collection handler, an EBB handler, or handler). This enables the pointer update handler to update the pointer (e.g., the address of the object) if the object pointed to has been moved during an ongoing garbage collection process or is moved by the handler. In order to update the pointer, the handler needs to know its address. The address of the pointer is calculated internally by the hardware during execution of the ldmx instruction, and is not available to the pointer update handler. Thus, in order to determine the address of the pointer in existing art, the pointer update handler is required to examine the ldmx instruction to determine the source registers, read the source registers, and calculate the address of the pointer based on contents of the source registers. These operations require numerous calculations and additional processing resources, causing the processing time to be increased while limiting overall system performance. Embodiments significantly shorten this time-consuming process as further explained below.

Figure 1:
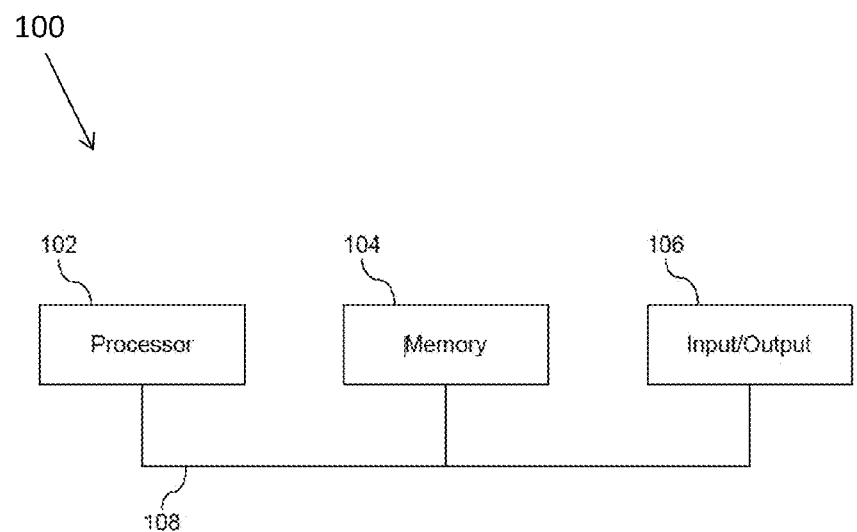
FIG. 1 depicts a block diagram illustrating a computing environment to incorporate and use one or more aspects according to a non-limiting embodiment.

With reference now to FIG. 1, a block diagram (100) is provided illustrating a computing environment to incorporate and use one or more aspects. The computing environment includes a processor (102) (e.g., a central processing unit), memory 104 (e.g., main memory), and one or more input/output (I/O) devices and/or interfaces (106) coupled to one another via, for example, one or more buses (108) and/or other connections.

The processor (102) is based on the Power Instruction Set Architecture (ISA) offered by International Business Machines Corporation. In at least one embodiment, the Power ISA is described in "Power ISA™ Version 2.07B," International Business Machines Corporation, Apr. 9, 2015, which is hereby incorporated herein by reference in its entirety. POWER ISA® is a registered trademark of International Business Machines Corporation, Armonk, N.Y., USA. Other names used herein may be registered trademarks, trademarks, or product names of International Business Machines Corporation or other companies.

In another example, processor (102) is based on the z/Architecture offered by International Business Machines Corporation, and is part of a server, such as the System z server, which implements the z/Architecture and is also offered by International Business Machines Corporation. At least one embodiment of the z/Architecture is described in an IBM® publication entitled, "z/Architecture Principles of Operation," IBM® Publication No. SA22-7832-09, Tenth Edition, September, 2012, which is hereby incorporated herein by reference in its entirety. In one example, the processor executes an operating system, such as z/OS, also offered by International Business Machines Corporation. IBM®, Z/ARCHITECTURE® and Z/OS® are registered trademarks of International Business Machines Corporation.

In yet a further embodiment, processor (102) is based on an Intel architecture offered by Intel Corporation. Intel® is a registered trademark of Intel Corporation, Santa Clara, Calif. Yet further, processor (102) may be based on other architectures. The architectures mentioned herein are merely provided as examples.

Figure 2:
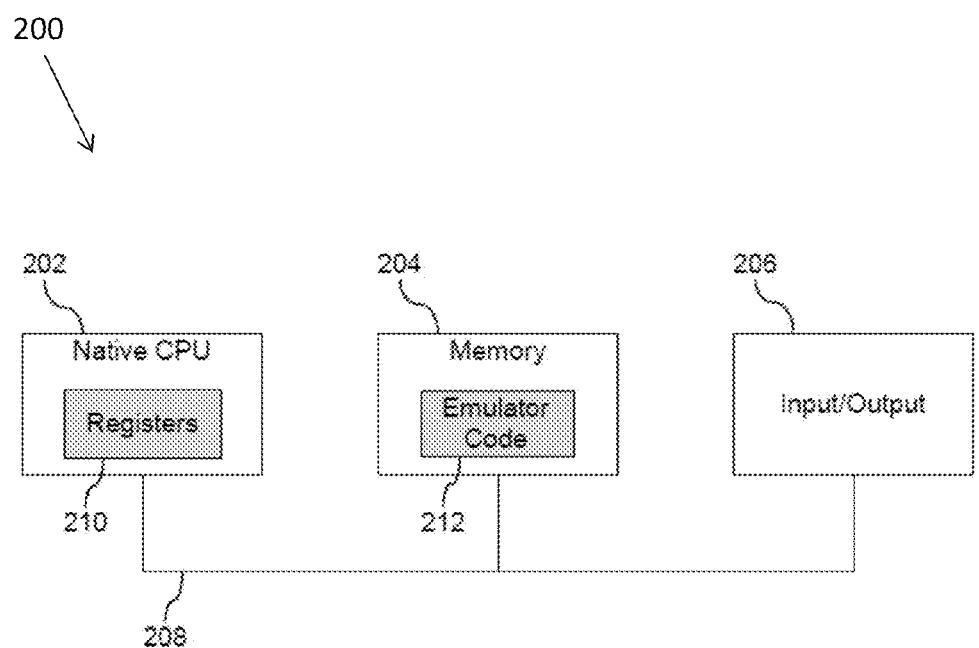
FIG. 2 depicts a block diagram illustrating a computing environment to incorporate and use one or more aspects according to a non-limiting embodiment.

Another non-limiting embodiment of a computing environment to incorporate and use one or more features is described with reference to FIG. 2. In this example, a computing environment (200) includes, for instance, a native central processing unit (202), memory (204), and one or more input/output devices and/or interfaces (206) coupled to one another via, for example, one or more buses (208) and/or other connections. As examples, computing environment (200) may include a PowerPC processor, a zSeries server, or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit (202) includes one or more native registers (210), such as one or more general purpose registers and/or one or more special purpose registers used during processing within the environment. These registers include information that represents the state of the environment at any particular point in time.

Moreover, native central processing unit (202) executes instructions and code that are stored in memory (204). In one particular example, the central processing unit executes emulator code (212) stored in memory (204). This code enables the processing environment configured in one architecture to emulate another architecture. For instance, emulator code (212) allows machines based on architectures other than the Power ISA, such as zSeries servers, pSeries servers, HP Superdome servers or others, to emulate the Power ISA and to execute software and instructions developed based on the Power ISA. In a further example, emulator code (212) allows machines based on architectures other than the z/Architecture, such as PowerPC processors, p Series servers, HP Superdome servers or others, to emulate the z/Architecture and to execute software and instructions developed based on the z/Architecture. Other architectures may also be emulated.

Figure 3:
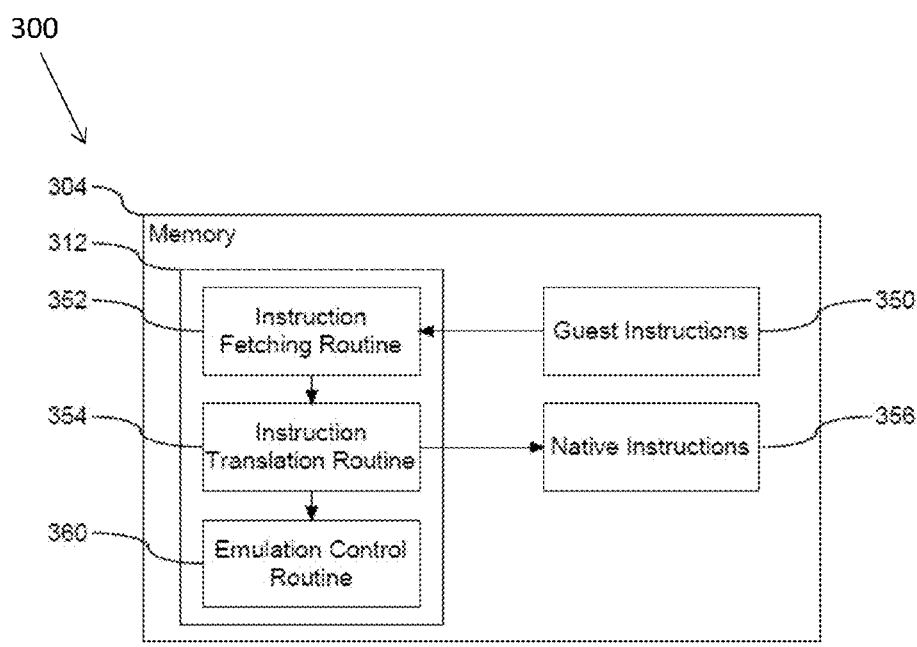
FIG. 3 depicts a block diagram illustrating further details with respect to the memory of FIG. 2.

Further details relating to emulator code (212) are described with reference to FIG. 3. As shown, FIG. 3 is a block diagram (300) of a computing environment. Guest instructions (350) stored in memory (304) comprise software instructions (e.g., correlating to machine instructions) that were developed to be executed in an architecture other than that of a native CPU. For example, guest instructions (350) may have been designed to execute on a PowerPC processor or a z/Architecture processor, such as processor (102) of FIG. 1, but instead, are being emulated on a native CPU, such as native CPU (202). The native CPU may be, for example, an Intel Itanium II processor. In one example, emulator code (312) includes an instruction fetching routine (352) to obtain one or more guest instructions (350) from memory (304), and to optionally provide local buffering for the instructions obtained. It also includes an instruction translation routine (354) to determine the type of guest instruction that has been obtained and to translate the guest instruction into one or more corresponding native instructions (356). This translation includes, for instance, identifying the function to be performed by the guest instruction and choosing the native instruction(s) to perform that function.

Further, emulator code (312) includes an emulation control routine (360) to cause the native instructions to be executed. Emulation control routine (360) may cause a native CPU to execute a routine of native instructions that emulate one or more previously obtained guest instructions and, at the conclusion of such execution, return control to the instruction fetch routine to emulate the obtaining of the next guest instruction or a group of guest instructions.

Execution of the native instructions (356) may include loading data into a register from memory (304); storing data back to memory from a register; or performing some type of arithmetic or logic operation, as determined by the translation routine.

Each routine is, for instance, implemented in software, which is stored in memory and executed by a native central processing unit. In other examples, one or more of the routines or operations are implemented in firmware, hardware, software or some combination thereof. The registers of the emulated processor may be emulated using registers of the native CPU or by using locations in memory (304). The guest instructions (350), the native instructions (356), and the emulator code (312) may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. The firmware may include, for example, proprietary code that is typically delivered as microcode that includes trusted software or microcode specific to the underlying hardware and controls operating system access to the system hardware.

In one example, a guest instruction (350) that is obtained, translated and executed is an instruction described herein. The instruction, which is of one architecture (e.g., the Power ISA or z/Architecture) is fetched from memory, translated and represented as a sequence of native instructions (356) of another architecture (e.g., the z/Architecture, Power ISA, Intel architecture, etc.). These native instructions are then executed.

In existing art, load doubleword indexed (ldx) instructions are not used to load object pointers, sometimes also referred to as "pointers". Instead, a load doubleword monitored indexed instruction (ldmx) is implemented. That is, whenever object pointers are to be loaded, the ldmx instruction is used, but in all other cases when loading doublewords, the traditional ldx instruction may be used. The load doubleword monitored indexed (ldmx) instruction has the same format as the load doubleword indexed (ldx) instruction, except the opcode is different as explained below.

Figure 4A:
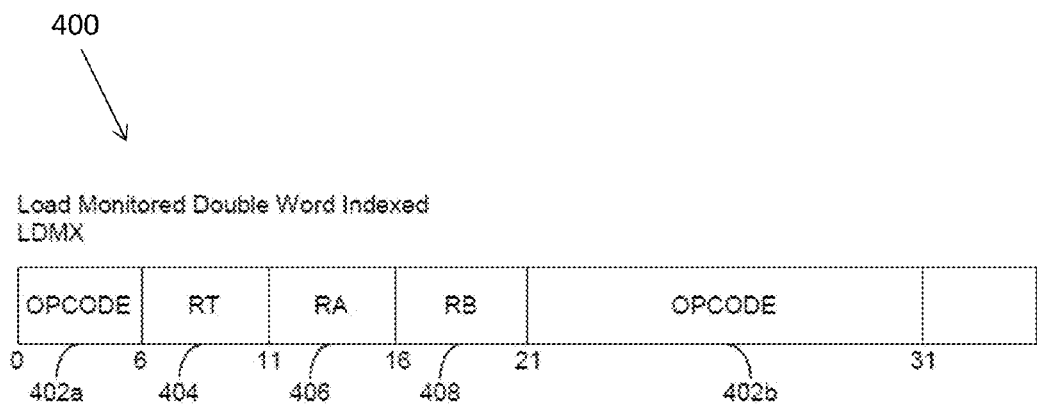
FIG. 4A depicts an illustrative example of a load monitored doubleword indexed instruction.

An example of a load doubleword monitored indexed instruction is described with reference to FIG. 4A. The load doubleword monitored indexed (ldmx) instruction (400) includes operation code (opcode) fields (402a) (e.g., bits 0-5), (402b) (e.g., bits 21-30) indicating a load pointer operation; a result field (RT) (404) (e.g., bits 6-10) used to indicate a register to store a result of the load operation (i.e. the pointer); a register field (RA) (406) (e.g., bits 11-15) used to specify a register to be used by the load operation; and a second register (RB) (408) (e.g., bits 16-20) used to specify a second register to be used by the load operation.

In operation of the ldmx instruction, a check is made as to whether the data to be loaded (e.g., the object pointer) points to an object located in a selected portion of memory, referred to herein as a load monitored region. If the data to be loaded does not point to an object located in the selected portion of memory, then a conventional load is performed. For instance, in one example, the load is performed as if a load doubleword indexed instruction (e.g., in the Power ISA) is being executed.

One example of pseudo-code for the ldmx instruction is as follows:
If RA=0, then b←0
else, b←(RA)
EA←b+(RB)
loaded_ea←MEM(EA, 8)
if, (loaded_ea is in enabled section of load-monitored region) and (BESCR GE LME=0b11)
initiate garbage collection EBB
Else
    RT←loaded_ea, In the above pseudo-code, "loaded_ea" is the object pointer; "EA" is an address of the object pointer; "BESCR" refers to branch event status-control register; "GE" refers to general enable; and "LME" refers to load monitored enabled. As shown in the pseudo-code, the effective address (EA) of the pointer to be loaded is the sum (RA|0)+(RB). If the pointer to be loaded points to an enabled section of the load monitored region and EBBs are enabled in the BESCR fields GE and LME, then a lightweight interrupt, referred to as an "Event-Based Branch (EBB), occurs; otherwise, the pointer is loaded into the destination register, RT. It should be noted that lightweight interrupts such as EBBs transfer control directly to an application-level EBB handler, thereby eliminating the involvement of the operating system as occurs in "normal" interrupts. This advantageously eliminates a significant amount of overhead necessary whenever control is transferred to an operating system. Although, in the examples herein, the instruction format is for the Power ISA, similar formats may be used for other architectures.

Alternatively, the load doubleword monitored (ldm) instruction may be used instead of ldmx. The ldm instruction behaves like ldmx except that the EA accessed would be calculated like a load doubleword (ld) instruction using RA and DS fields instead of operands RA and RB as with ldx.

Figure 4B:
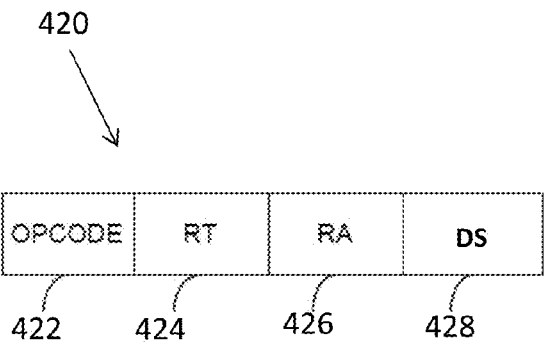
FIG. 4B depicts an illustrative example of load doubleword monitored instruction.

An example of a load doubleword monitored instruction is described with reference to FIG. 4B. The load doubleword monitored (ldm) instruction (420) includes operation code (opcode) fields (422) indicating a load pointer operation; a result field (RT) (424) used to indicate a register to store a result of the load operation (i.e. the pointer); a register field (RA) (426) used to specify a register to be used by the load operation; and an offset field (DS) used to specify a variable to be used by the load operation.

One example of pseudo-code for the ldm instruction is as follows:
If RA=0, then b←0
Else, b←(RA)
EA←b+EXTS(DS||0b00)
loaded_ea←MEM(EA, 8)
if, (loaded_ea is in enabled section of load-monitored region) & ($BESCR_{GE\ LME}$0b11)
initiate garbage collection EBB,
Else, RT←loaded_ea As shown in the pseudo-code, the effective address (EA) of the pointer to be loaded is the sum (RA|0)+EXTS (DS||0b00). Other than calculating the EA as above, the operation of the ldm instruction is identical to the operation of the ldmx instruction described earlier. Although, in the examples herein, the instruction format is for the Power ISA, similar formats may be used for other architectures.

Figure 5:
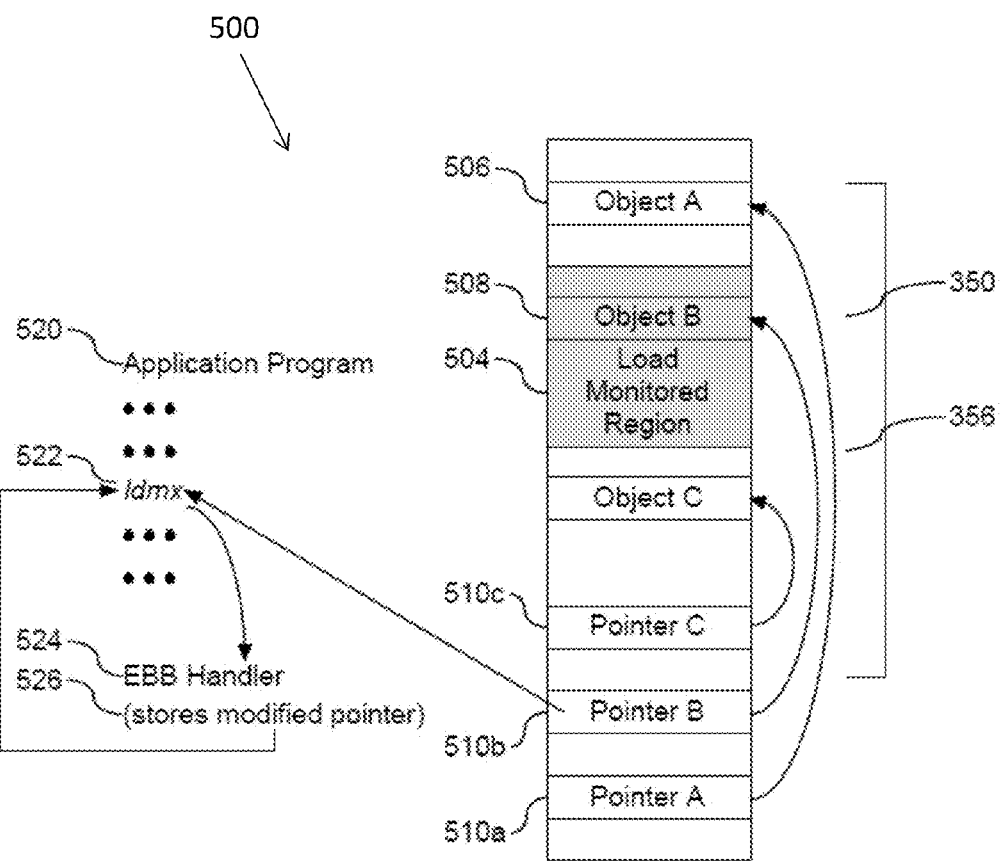
FIG. 5 depicts a block diagram illustrating detail of memory for which garbage collection is to be performed.

As explained previously, the selected portion of memory undergoing garbage collection (e.g., a memory block of user address space) is referred to herein as the load monitored region. Referring to FIG. 5, a block diagram (500) is shown illustrating memory, and specifically regions within the memory. As shown, memory (502) includes a load monitored region (504), as well as a plurality of objects, including ObjectA (506) and ObjectB (508). As shown, ObjectB (508) is in the shaded load monitored region (504), meaning that the object is in a portion of memory in which garbage collection is being performed. Therefore, the current pointer may need to be updated, if the object to which the pointer points has been moved due to, for instance, the garbage collection process.

Further, as used herein, an object area includes the load monitored region and the area of memory including objects that are not undergoing garbage collection. Additionally, the memory (502) may include a plurality of pointers shown as pointerA (510a), pointerB (510b), and pointerC (510c).

In this figure, it is further shown that an application program (520) executes an ldmx instruction (522), which attempts to load pointerB (510b). PointerB (510b) points to ObjectB (508) in the load monitored region, and thus, an EBB is performed giving control to the EBB handler (524) (also known as the update pointer handler, or handler). The handler (524) calculates a pointer address for PointerB (510b), i.e., the address at which PointerB (510b) is located, by reading the image of the load monitored instruction to determine the source registers, reading the source registers, and calculating the pointer address using data read from the source registers. The handler (524) then reads the pointer using a "normal" load instruction, modifies the pointer, if necessary, and if modified stores the pointer in the location from which it was obtained (526). Processing then returns to the application at the ldmx instruction, which is re-executed. Details of the pointer address calculation are shown in the pseudo code described above. These calculations, required in existing art, are time consuming, and embodiments advantageously eliminate the need for them as further described below.

Alternatively, the handler may modify the pointer, and store the modified pointer in the target register of the instruction. Processing would then continue at the instruction after the ldmx instruction. This would have the effect of emulating the load of the pointer without the need to re-execute the ldmx instruction. In one or more aspects, the application is unaware of the EBB processing, and simply receives the pointer, as if the EBB never occurred.

Figure 6:
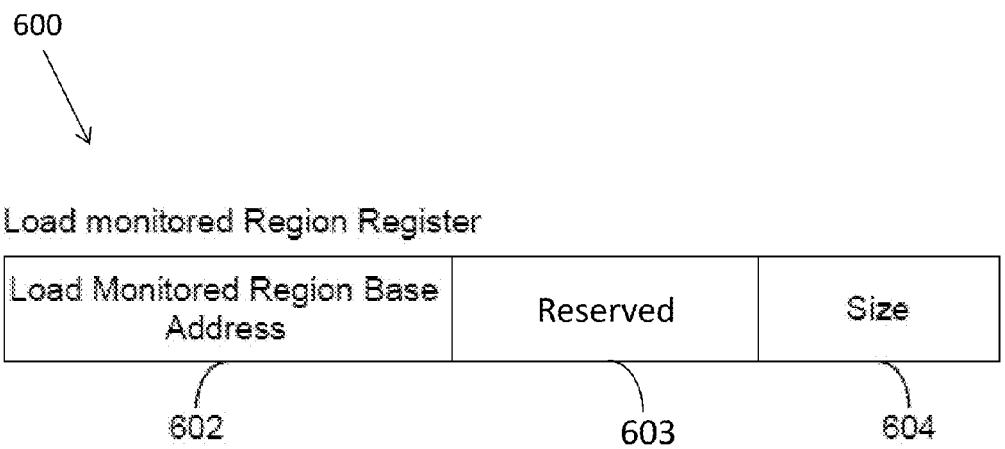
FIG. 6 depicts an illustrative example of a load monitored region register.

As indicated above, lightweight interrupt processing is performed when the data to be loaded (e.g., the object pointer) points to an object that is in the load monitored region of memory. The load monitored region may be identified in alternative ways. For instance, in one implementation, its size and base address are stored in a register, such as depicted in FIG. 6. As shown, a load monitored region register (LMRR) (600) includes, for instance, a base address field (602) including a load monitored region base address, a reserved field (603) that is not used here but is reserved for use in future enhancements, and a size field (604) indicating a size of the region. The size field (604) ranges, for example, from bits 60 to 63.

In one example, the load monitored region base address includes the high-order bits of the load monitored region. It may be assumed that the load monitored region is aligned on a granularity of its size. The size field is encoded such that each value corresponds to a specified size. For example, if 16 possible sizes are needed, the size field has 4 bits. Typical sizes are in the order of 10's of MBs (megabytes) to over a GB (gigabyte). The number of bits in the load monitored region base address field can be derived from the minimum size supported.

For example, if the minimum size supported is 16 MB, then the load monitored region base address field is 40 bits, which is sufficient to identify any 16 MB memory region aligned on a 16 MB address boundary. When the size field indicates smaller sizes, then more bits are required to specify the base address.

In other examples, the size and base address may be specified in a memory location, or as part of another register used for another purpose, etc. Additionally, other formats may be used to specify the address range of the load monitored region.

The load monitored region may be subdivided into segments of equal size, where each segment is 1/Nth of the total load monitored region size. A Load Monitored Segment Enable Register (LMSER) may also be provided where each bit corresponds to a segment. For example, a 64-bit register could be used to subdivide a load monitored region into 64 segments, where each segment is ¹⁄₆₄th of the total load monitored region.

The LMRR 600 may indicate a base address and size of a garbage collection (GC) region. The regions include a single block of storage aligned on a multiple of its size. For example, region sizes may increase in size by a factor of 2, e.g., 32 MB, 64 MB, 128 MB, 256 MB, 512 MB, 1 GB, 2 GB, 4 GB, 8 GB, 16 GB, 32 GB, 64 GB, 128 GB, 256 GB, 512 GB, 1 TB, etc. The base address field (602) ranges from bit 0 to bit 38, for example, where bit 0 is the most-significant bit. Accordingly, the execution of the ldmx instruction assumes that all regions are aligned on multiples of their size. In an example including a region size of 1 TB, the ldmx instruction uses bits 0 to 23 in identifying the load monitored region, while ignoring bits 24 to 38 of the base address field. In another non-limiting embodiment including a region size of 32 MB, the ldmx instruction uses every bit of the base address field, i.e., bits 0 to 38, in identifying the load monitored region.

Figure 7:
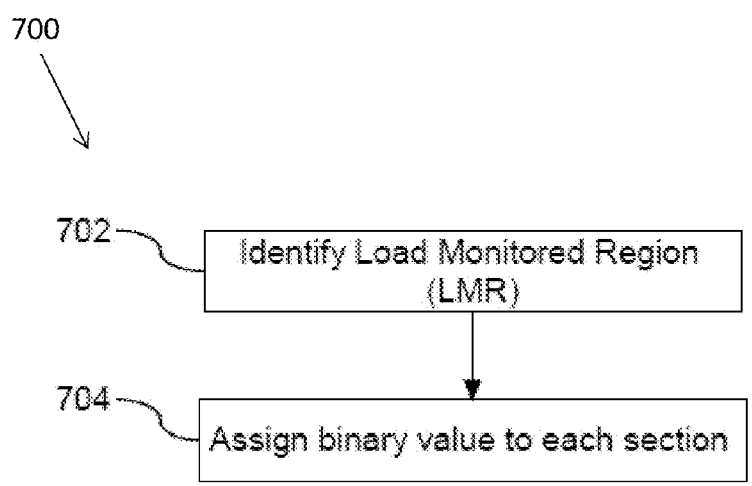
FIG. 7 depicts a flowchart illustrating a process for configuring the LMRR and LMSER.

With reference now to FIG. 7 a flowchart (700) is provided illustrating an example as to how the LMRR and LMSER are configured. First, the load monitored region (LMR) is specified in the LMRR (702). Details of such specification have been described above, with reference to FIG. 6. Then a binary value is assigned to each section in the LMSER (704), where a first binary value corresponds to an enabled section (i.e., a section of the load monitored region that is identified for garbage collection), and a second binary value corresponds to a disabled section (i.e., a section that is not subject to garbage collection).

Figure 8A:
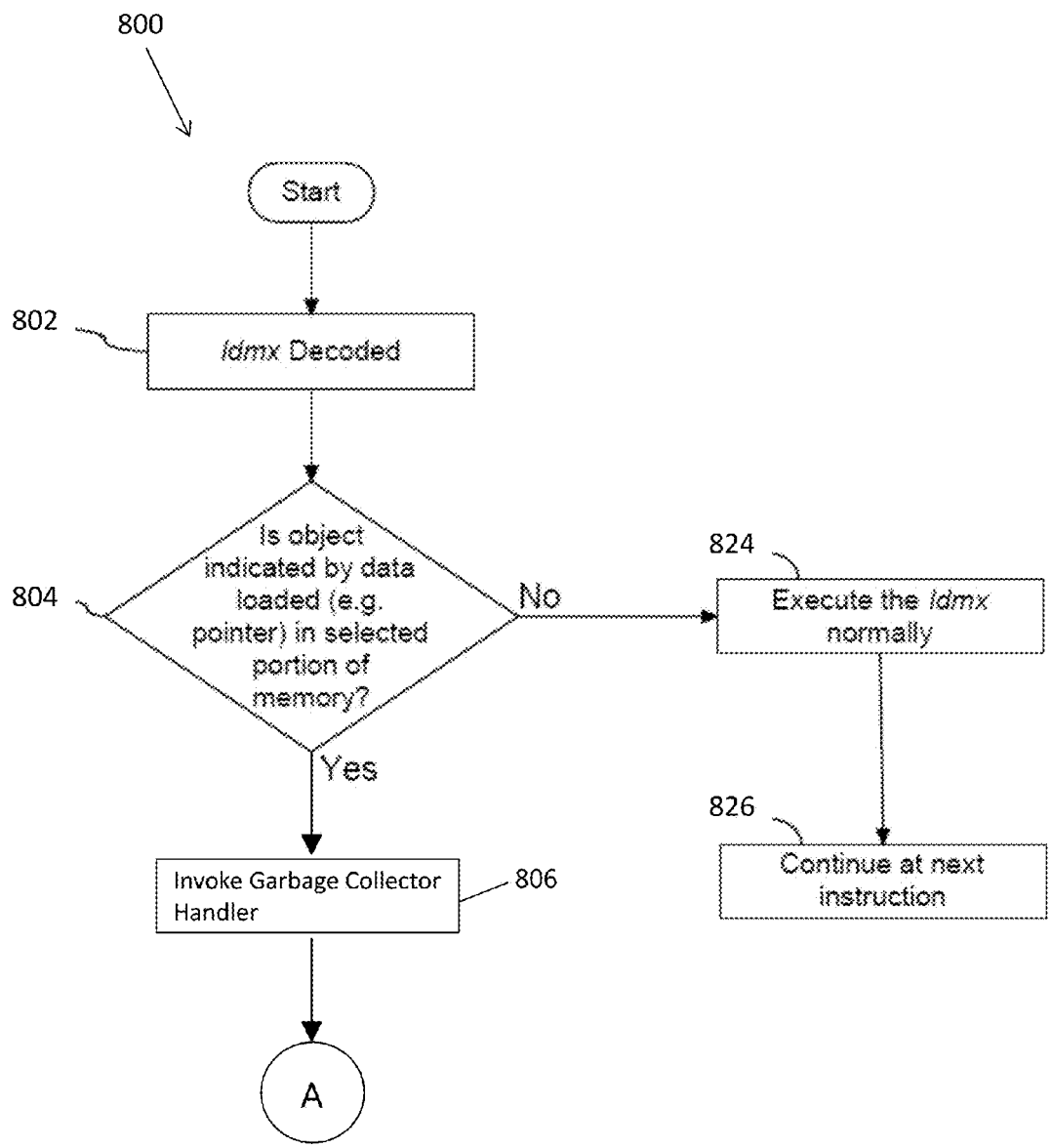
FIGS. 8A-8B depict an illustrative example of logic to perform garbage collection using the load monitored doubleword indexed instruction.

Referring now to FIG. 8A, a flowchart (800) illustrates an example of logic associated with executing the ldmx instruction. The hardware of a processor executes an application that issues the ldmx instruction, and the processor hardware decodes the ldmx instruction (802). During execution of the instruction, the processor hardware determines the memory location addressed by the instruction, and compares the data at that address (i.e., the pointer) read with the load monitored region register (or other register or memory location) that specifies the selected portion of memory undergoing the garbage collection (804). If the pointer that was read points to a location within the load monitored region, then the hardware causes a lightweight interrupt (e.g., an Event Based Branch that does not involve the supervisor) that diverts execution to the garbage collection handler at operation 806.

Turning to operation 808 (see FIG. 8B), the garbage collector EBB reads the instruction image, and at operation 810 the garbage collector EBB reads the source register (see FIG. 4B, element 426) and the offset value DS (see FIG. 4B, element 428) to obtain the pointer address of the ldmx instruction. At operation 812, the garbage collector handler calculates the pointer EA from source register RA and offset field DS, and based on the calculations determines the pointer address at operation 814. The calculations performed to determine the pointer address represents a time consuming process that existing art requires but which embodiments eliminate by using a new ldmax instruction as further explained in greater detail with respect to FIG. 11 later.

Figure 8B:
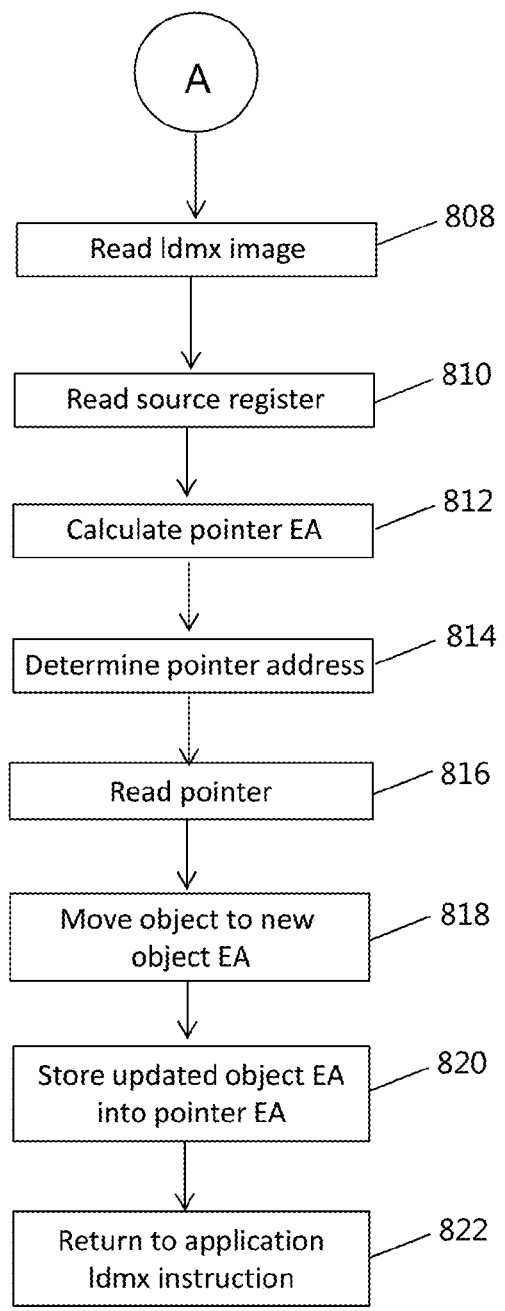

Still referring to FIG. 8B, at operation 816 the garbage collection handler reads the pointer from the address that was determined as explained above (e.g., operation 814). At operation 818, the garbage collection handler moves the object to a location (i.e. to an effective address, EA in memory) that is outside of the load monitored region, and updates the pointer to point to the object. At operation 820, the EA of the object is loaded with the updated pointer, and the garbage collection handler returns control to the application at the ldmx instruction at operation 822. When the application re-executes the ldmx instruction, since the pointer now points outside the load monitored region as explained above, the ldmx loads the pointer without interruption.

Returning to operation (804), if the pointer that was read does not point to a location within the load monitored region, then the processor hardware does not cause the Event Based Branch, but instead executes the ldmx instruction without causing the EBB at operation (824). For instance, the ldmx instruction is processed as if the load doubleword indexed instruction was executed, as described above. In particular, in one example, the pointer is read from the location identified by the instruction and it is stored in the target register. Thereafter, processing continues to the next instruction at operation (826).

As described herein, garbage collection is optimized by allowing applications to continue processing (without being paused due to garbage collection) when those applications are not accessing objects in an area of memory undergoing garbage collection. Further, garbage collection is optimized by allowing applications accessing objects in an area of memory undergoing garbage collection to immediately resume processing after a very brief delay during the time the lightweight interrupt handler processes the pointer. This is enabled by determining during the load of the pointer that the object is in the selected portion of memory undergoing garbage collection, and based thereon, causing an EBB to occur such that the handler may take immediate action and quickly return control to the application.

Additionally, one or more aspects may be used for other than garbage collection. For example, since one or more aspects described herein may be used to detect when a pointer to a specified storage address range is loaded, it may be used to provide an advance warning about imminent access into a restricted memory space. In this case, a memory region is initialized to be the restricted memory region, Subsequently, when a pointer is read that points to a restricted area, an EBB occurs.

Figure 9:
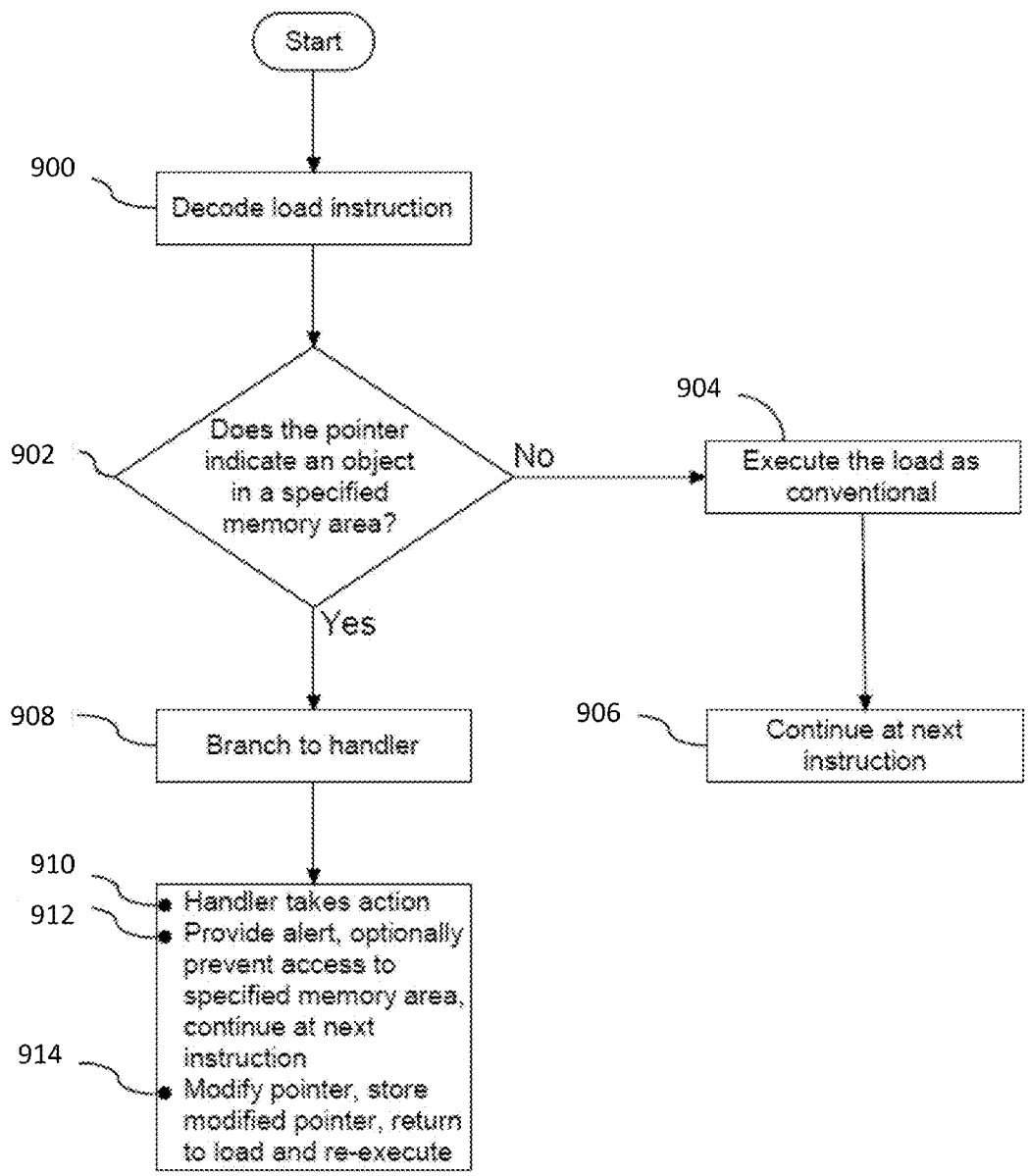
FIG. 9 depicts a non-limiting embodiment of logic to take action by a handler based on a condition.

For example, a handler may take action based on a specific condition as described with reference to FIG. 9. In one example, a load instruction is decoded, (900). The load instruction may be one of various load instructions, including the ldm or ldmx instruction, as examples. The load instruction is decoded and based on the decoding, the object pointer is determined. A determination is made as to whether the object pointer indicates an object in a specified memory area, (902). This memory area is, for instance, a specified storage address range that is to be restricted for one reason or the other. If the pointer does not indicate an object in the specified memory area, then the ldmx (or other instruction) is executed as conventional, (904). Processing then continues at the next instruction, (906).

However, returning to (902), if the pointer does indicate an object in a specified memory area, then control is obtained by a handler, (908). For instance, the processor hardware performs an interrupt (e.g., a lightweight interrupt that does not involve the operating system) to the handler (e.g., an application-level handler). The handler may then take one or more actions, (910). For example, the handler may provide an alert, optionally prevent access to the specified memory area, and then continue processing at the next instruction, (912). As a further example, the handler may obtain the pointer address (e.g., calculates it from the instruction), read the pointer, modify the pointer, store the modified pointer back in the location from which it was read, and return control to the instruction and re-executes the instruction, such that the specified memory area is not accessed, (914). Other possibilities also exist.

As described above, processing may be diverted to a real-time garbage collection handler in response to an EBB if the pointer to be loaded points to an enabled section of the load monitored region. If the pointer is to be modified, the handler needs to determine the address of the pointer in order to modify it. Since existing art does not provide the handler with this address, the handler needs to determine it by 1) reading the ldmx instruction image to determine the source registers, 2) reading the source registers, and 3) calculating the pointer address using source registers RA and RB. It then needs to read the pointer, modify it, and store it back to the same location. These steps are time consuming and represent a significant overhead. In order to eliminate the majority of this overhead, embodiments advantageously use a new instruction, described below. This new instruction, referred to as the Load Doubleword Monitored or Address Indexed (ldmax) instruction. When the ldmax instruction is used, if the pointer to be loaded points to an enabled section of the load monitored region, then the pointer address is loaded into the destination register before the EBB occurs. This enables the EBB handler to obtain the pointer address directly from the destination register instead of being required to calculate the address as outlined above.

Figure 10:
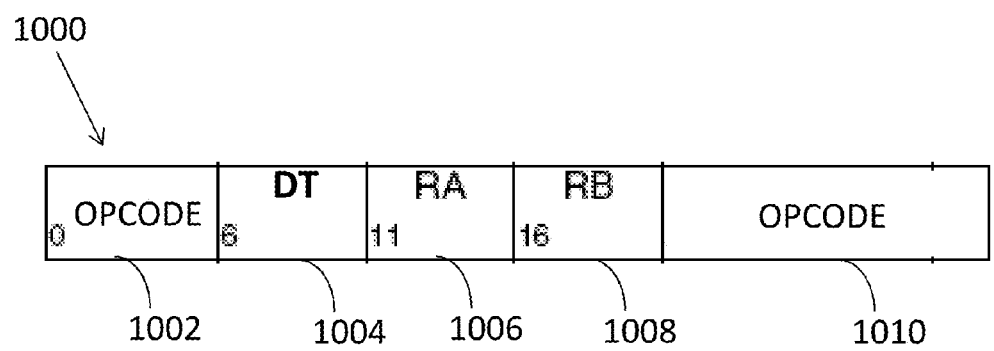
FIG. 10 illustrates an image of a Load Doubleword Monitored with Address Indexed X-form (ldmax) instruction according to a non-limiting embodiment.

Turning now to FIG. 10, the ldmax instruction (1000) includes a first operation code (OPCODE) field (1002) (e.g., bits 0-5), a destination register field (DT) (1004) (e.g., bits 6-10) used to indicate a register to selectively store either a pointer address or a the pointer addressed by the instruction based on whether the address indicated by the pointer is included in the load monitored region; a first source register field (RA) (1006) (e.g., bits 11-15) used to specify a register to be used by the load operation; a second source register field (RB) (1008) (e.g., bits 16-20) used to specify a second register to be used by the load operation, and a second OPCODE field (1010). The first and second OPCODE fields 1002/1010 are used to indicate a load pointer operation.

One example of pseudo-code for the ldmax instruction (1000) is as follows:
If RA=0, then b←0
Else, b←(RA)
EA1←b+(RB)
Object address←MEM(EA1, 8),
If (Object address is in enabled section of load-monitored region) & (BESCRGE LME=0b11)
  DT←EA1,
  Initiate garbage collection EBB,
Else,
  DT←object address As shown in the pseudo-code, the effective address (EA1) of the pointer to be loaded is the sum of (RA|0)+(RB), and the object address is the contents of the doubleword in storage addressed by EA1 (i.e. the contents of the pointer). If the object address is within the load-monitored region and EBBs are enabled in the BESCR fields GE and LME, then EA1 (i.e. the address of the pointer) is loaded into register DT (1004) and a garbage collection EBB is initiated. Otherwise, the pointer itself is loaded into register DT (1004) and an EBB is not initiated.

During operation, the ldmax instruction (1000) first checks to determine if the requested object pointer points into the load-monitored region (See FIG. 5). In at least one embodiment, the load-monitored region is a range of memory effective addresses (EAs) in the memory unit on which garbage collection is being performed (e.g., See FIG. 5, LMR 504). When the requested object pointer does not point into a load-monitored region (i.e., points to a region of memory outside the load-monitored region; e.g., see FIG. 5, pointerA 510*a* and ObjectA 510*a*), the instruction (1000) loads the object pointer into the destination register field (1004) without causing a garbage collection EBB. When, however, the requested object pointer points to an object located in the load-monitored region (e.g. see FIG. 5, pointerB 510*b* and ObjectB 508), the instruction (1000) loads the EA of the object pointer (i.e., the pointer address) into the destination register (1004) and invokes a garbage collection EBB.

Upon entering the garbage collection EBB, it should be appreciated that the destination register DT (1004) of the ldmax (1000) already contains the address of the object pointer (i.e., the pointer EA). Therefore, unlike previously designed processing systems which used ldmx and were required to read the ldmx instruction image to determine the source registers, read these registers, and calculate the pointer address using the two registers, the garbage collector EBB handler in this embodiment uses the ldmax instruction, and thus needs only to read the pointer address directly from the destination register DT (1004). Since reading the destination register DT (1004) requires significantly fewer instructions than reading the source registers and calculating the pointer address, this represents a significant improvement over previous systems. Additionally, in at least one embodiment, a program may optionally adhere to a convention which requires only a specific destination register DT (1004) to be used. In this non-limiting embodiment, the need to read the instruction image (1000) to determine DT (1004) is eliminated since the value stored in DT (1004) would be known. This advantageously eliminates multiple instructions that would otherwise be necessary to determine DT.

After reading the pointer EA from register DT (1004), the garbage collector handler further reads the object pointer from that EA in order to determine the object address. The garbage collection handler can then move the object to its new location in order to perform garbage collection. This new location will typically be outside of the load monitored region so that further accesses to the pointer will not result in additional EBBs. The garbage collector handler then overwrites the pointer at the pointer EA with the new pointer EA, which points to the relocated object. The garbage collector handler then returns control to the application's ldmax instruction (1000) so that it will be re-executed.

When the ldmax instruction (1000) is re-executed by the application, no garbage collection EBB will occur since the pointer now points to a location outside the load-monitored region as explained above, and the destination register DT of the ldmax instruction (1000) is loaded with pointer, itself. It should be appreciated that even though the garbage collection EBB occurred and the ldmax (1000) was attempted twice, the execution of ldmax appears to simply load the pointer since the EBB is invisible to the application. Therefore, the application is unaware of the actions of the garbage collector EBB handler, thereby enabling garbage collection to proceed transparently during normal execution of the application.

Figure 11A:
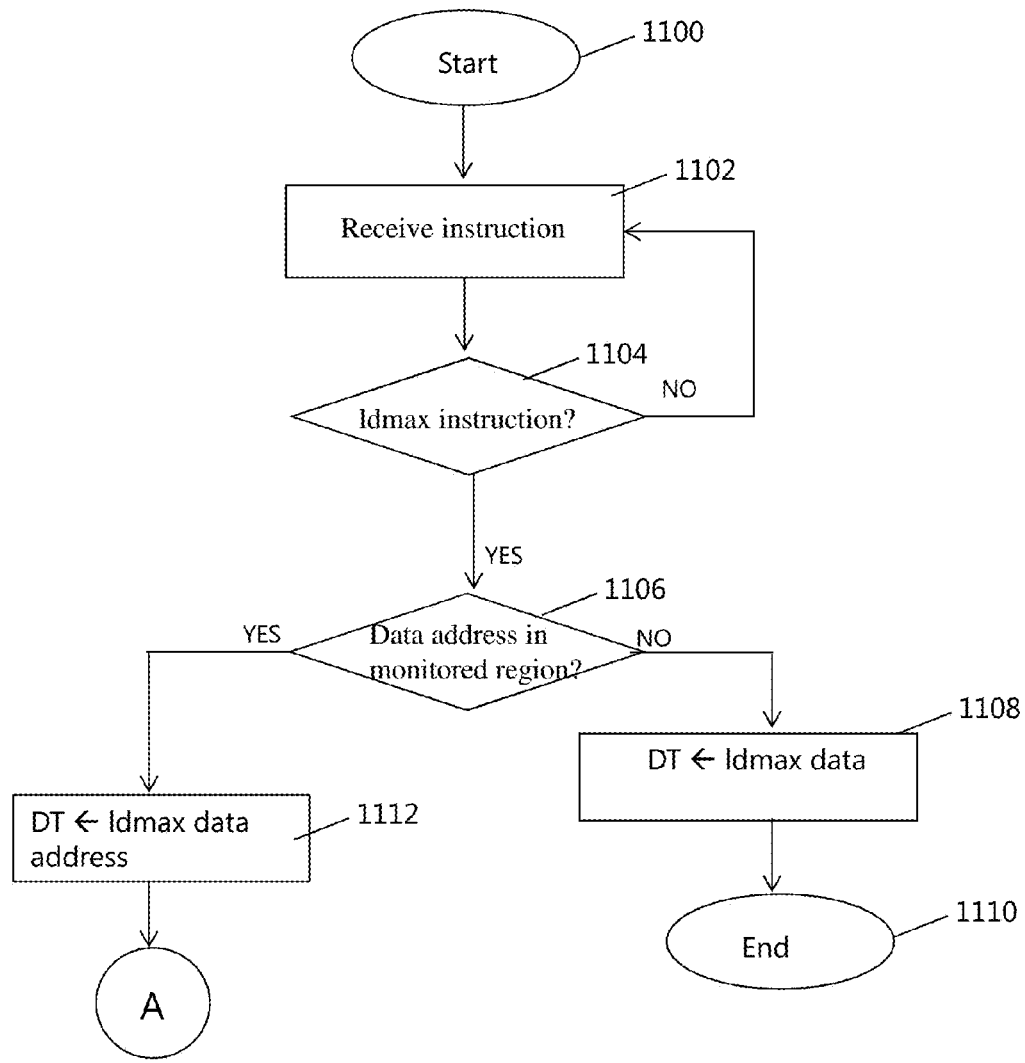
FIGS. 11A-11B is flow diagram illustrating a method of managing a memory unit according to a non-limiting embodiment.
Figure 11B:
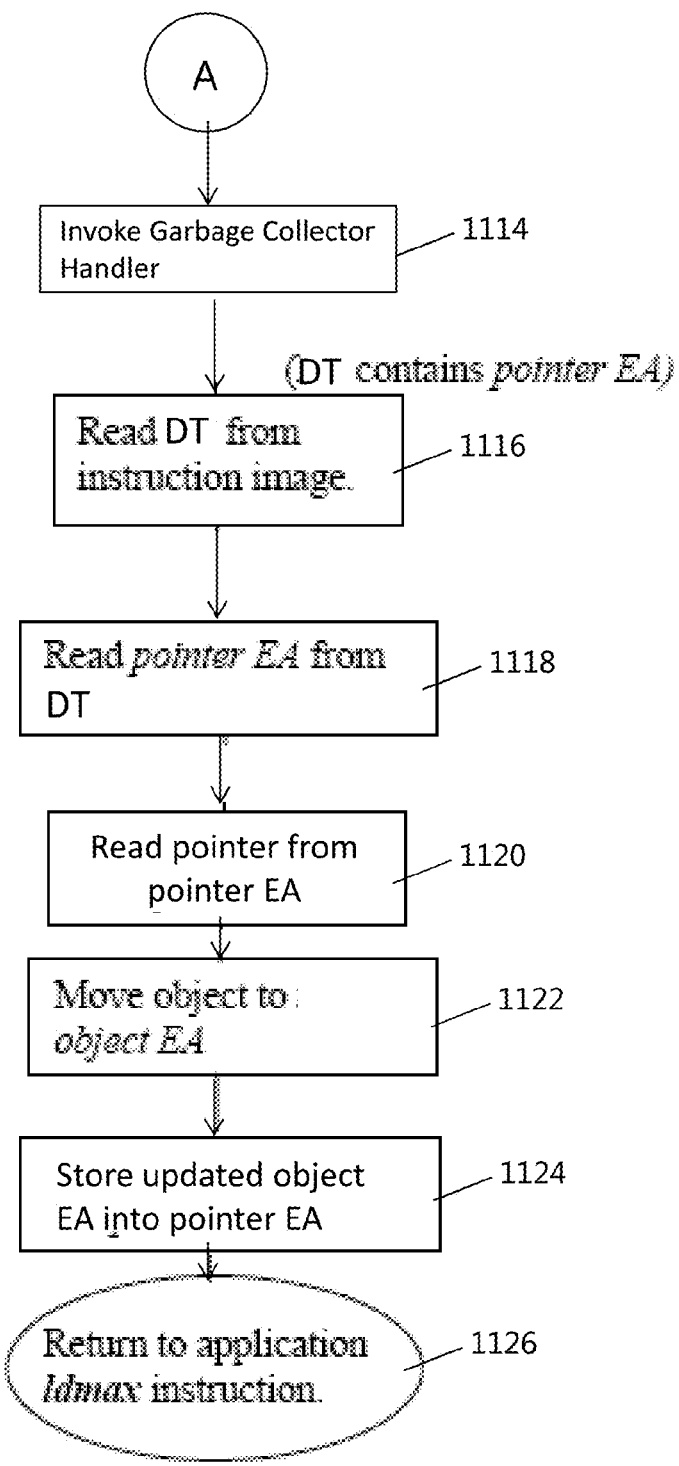

Turning now to FIGS. 11A-11B, a flow diagram illustrates a method of performing a garbage collection process according to a non-limiting embodiment. The method begins at operation 1100, and receives an instruction at operation 1102. At operation 1104, a determination is made as to whether the received instruction is an ldmax instruction. When an ldmax instruction is not received, the method returns to operation 1102 and receives a new instruction. Otherwise, at operation 1106, the instruction is executed and the instruction determines whether the data address to be loaded (i.e. the pointer) points to a memory location in the load-monitored region of the memory unit.

When the data address does not point to a memory location in the load-monitored region, the ldmax behaves as a "normal" load instruction and simply loads the addressed data at operation 1108. In this manner, a pointer is loaded into the destination register (DT) at operation 1108, and the method ends at operation 1110.

When, however, the data address exists in the load-monitored region at operation 1106, the pointer address is loaded in the destination register (DT) at operation 1112, and a garbage collection EBB is invoked at operation 1114. At operation 1116, the garbage collector EBB obtains the pointer address by reading the instruction image to determine DT (unless DT is known by convention as explained above), and at operation 1118 reads register DT to determine the pointer. In this manner, the calculations to determine the pointer address from the ldmax source registers in previously designed garbage collector systems are eliminated, and performance is improved.

At operation 1120, the garbage collection handler reads the pointer from the address that was determined by reading the destination register as explained above. At operation 1122, the garbage collection handler moves the object to a location outside of the load monitored region, and updates the pointer to point to the object. At operation 1124, the EA from which the pointer was read is overwritten with the updated pointer, and the garbage collection handler returns control to the application at the ldmax instruction at operation 1126. When the application re-executes the ldmax instruction, since the pointer now points outside the load monitored region as explained above, the ldmax loads the pointer without interruption.

As described above, various non-limiting embodiments provide a new ldmax instruction designed to provide a garbage collection EBB with a pointer address in the destination register in the event the ldmax attempts to load a pointer that points to an object located in a load-monitored region of the memory unit. Since the pointer address is directly obtained in response to reading the destination register (DT) of the ldmax, numerous calculations performed in previously designed garbage collection systems in order to determine the pointer address may be eliminated. Various time-consuming calculations performed by previously designed garbage collection schemes include, but are not limited to, determining the source registers of the instruction in the application that reads the pointer, reading the source register contents, and calculating the effective pointer address (pointer EA) based on the source register contents.

The elimination of the conventional pointer address calculation provides various advantages including, for example, decreasing latency necessary to execute the ldmax instruction. Accordingly, various programs such as Java, for example, may be employed to in important business application such as real-time transaction processing and high-speed trading, which would in many cases not be possible using the existing ldmx instruction. In addition, since the ldmax instruction uses the source register to store the pointer address, it does not require any dedicated registers to store the pointer address. This resulting feature not only reduces the hardware cost of the system employing the ldmax instruction, but also eliminates any additional overhead that would otherwise be necessary during context swap operation in order save and restore any special-purpose pointer registers.

In a similar manner as described above with respect to FIG. 9, one or more aspects of the ldmax instruction may be used for other than garbage collection. For example, since one or more aspects described herein may be used to detect when a pointer to a specified storage address range is loaded, it may be used to provide an advance warning about imminent access into a restricted memory space. In this case, a memory region is initialized to be the restricted memory region. Subsequently, when a pointer is read that points to a restricted area, an EBB occurs.

The EBB handler may also perform additional operations as described with reference to FIG. 9. For example, the handler may provide an alert, optionally prevent access to the specified memory area, and then return control to continue processing at the next instruction after the ldmax instruction. As a further example, the handler may obtain the pointer address (e.g., read it from the destination register, DT), read the pointer, modify the pointer, store the modified pointer back in the location from which it was read, and return control to the ldmax instruction so that the instruction is re-executed and the specified memory area is not accessed. Other possibilities also exist.

Figure 12:
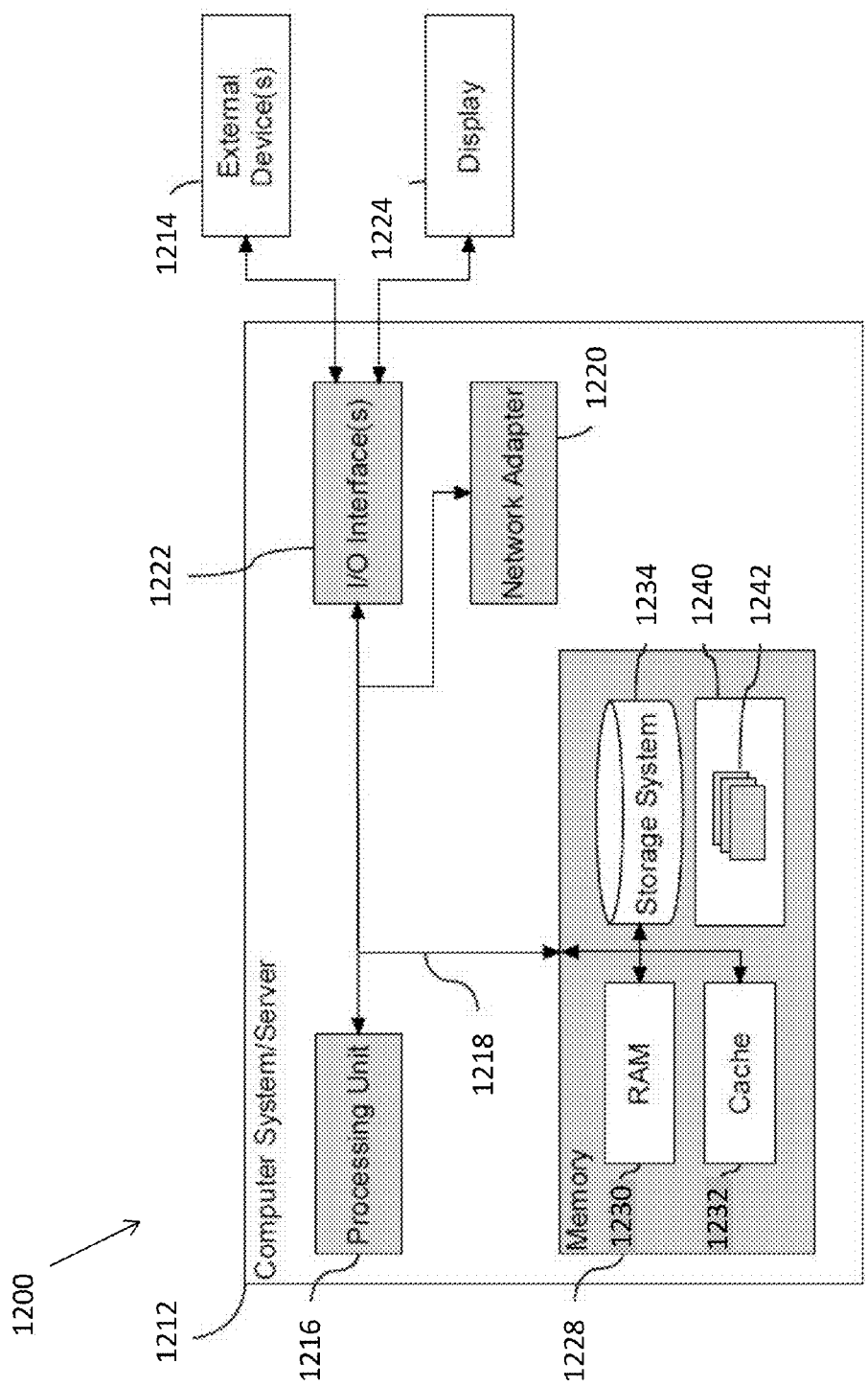
FIG. 12 depicts a block diagram illustrating a system to perform a garbage collection process according to a non-limiting embodiment.

Referring now to FIG. 12, a computer system/server (1212) is shown in the form of a general-purpose computing device (1200). The components of computer system/server (1212) may include, but are not limited to, one or more processors or processing units (1216), a system memory (1228), and a bus (1218) that couples various system components, including system memory (1228) to processor (1216).

Bus (1218) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server (1212) typically includes a variety of computer system readable media. Such media may be any available media that is accessible by computer system/server (1212), and it includes both volatile and non-volatile media, removable and non-removable media.

System memory (1228) can include computer system readable media in the form of volatile memory, such as random access memory (RAM) (1230) and/or cache memory (1232). Computer system/server (1212) may further include other removable/non-removable, volatile/non-volatile computer system storage media. By way of example only, storage system (1234) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (1218) by one or more data media interfaces. As will be further depicted and described below, memory (1228) may include at least one program product having a set (e.g., at least one) of program modules that are configured to carry out the functions of embodiments of the invention.

Program/utility (1240), having a set (at least one) of program modules (1242), may be stored in memory (1228) by way of example, and not limitation, as well as an operating system, one or more application programs, other program modules, and program data. Each of the operating system, one or more application programs, other program modules, and program data or some combination thereof, may include an implementation of a networking environment. Program modules (1242) generally carry out the functions and/or methodologies of embodiments of the invention as described herein.

Computer system/server (1212) may also communicate with one or more external devices (1214) such as a keyboard, a pointing device, a display (1224), etc.; one or more devices that enable a user to interact with computer system/server (1212); and/or any devices (e.g., network card, modem, etc.) that enable computer system/server (1212) to communicate with one or more other computing devices. Such communication can occur via Input/Output (I/O) interfaces (1222). Still yet, computer system/server (1212) can communicate with one or more networks such as a local area network (LAN), a general wide area network (WAN), and/or a public network (e.g., the Internet) via network adapter (1220). As depicted, network adapter (1220) communicates with the other components of computer system/server (1212) via bus (1218). It should be understood that although not shown, other hardware and/or software components could be used in conjunction with computer system/server (1212). Examples, include, but are not limited to: microcode, device drivers, redundant processing units, external disk drive arrays, RAID systems, tape drives, and data archival storage systems, etc.

Figure 13:
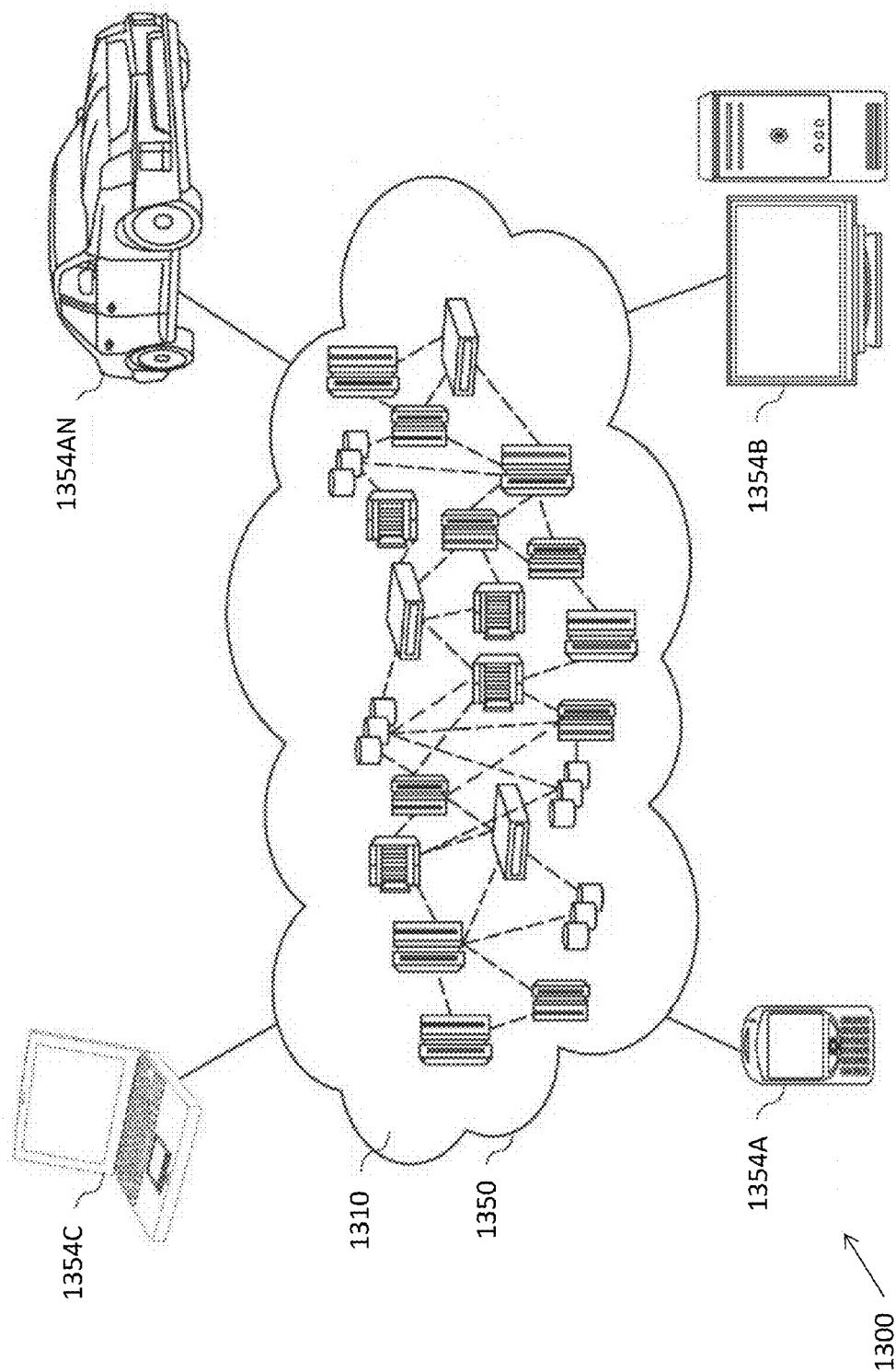
FIG. 13 depicts an illustrative example of a cloud computing environment according to a non-limiting embodiment.

Referring to FIG. 13, an illustrative cloud computing environment (1300) is depicted. As shown, cloud computing environment (1300) comprises one or more cloud computing nodes (1310) with which local computing devices used by cloud consumers, such as, for example, personal digital assistant (PDA) or cellular telephone (1354A), desktop computer (1354B), laptop computer (1354C), and/or automobile computer system (1354N) may communicate. Computing nodes (1310) may communicate with one another. They may be grouped (not shown) physically or virtually, in one or more networks, such as Private, Community, Public, or Hybrid clouds as described hereinabove, or a combination thereof. This allows cloud computing environment (1300) to offer infrastructure, platforms and/or software as services for which a cloud consumer does not need to maintain resources on a local computing device. It is understood that the types of computing devices (1354A)-(1354N) shown in FIG. 14 are intended to be illustrative only and that computing nodes (1310) and cloud computing environment (1500) can communicate with any type of computerized device over any type of network and/or network addressable connection (e.g., using a web browser).

Figure 14:
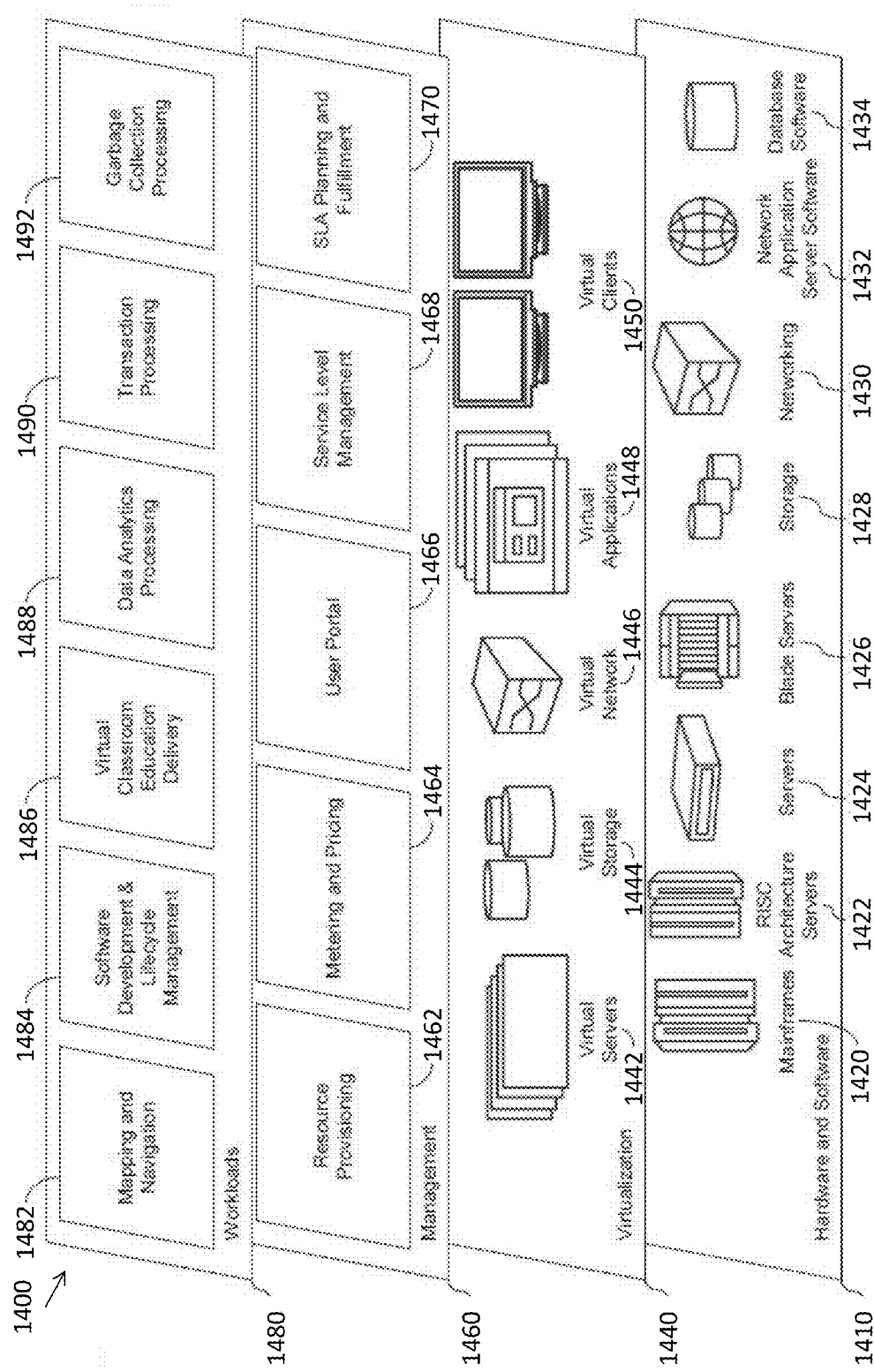
FIG. 14 depicts an illustrative example of abstraction model layers according to a non-limiting embodiment.

Referring now to FIG. 14, a set of functional abstraction layers (1400) provided by cloud computing environment (1300) of FIG. 13 is shown. It should be understood in advance that the components, layers, and functions shown in FIG. 14 are intended to be illustrative only and embodiments of the invention are not limited thereto. As depicted, the following layers and corresponding functions are provided:

Hardware and software layer (1410) includes hardware and software components. Examples of hardware components include mainframes (1420); RISC (Reduced Instruction Set Computer) architecture based servers (1422); servers (1424); blade servers (1426); storage devices (1428); networks and networking components (1430). In some embodiments, software components include network application server software (1432) and database software (1434).

Virtualization layer (1440) provides an abstraction layer from which the following examples of virtual entities may be provided: virtual servers (1442); virtual storage (1444); virtual networks (1446), including virtual private networks; virtual applications and operating systems (1448); and virtual clients (1450).

In one example, management layer (1460) may provide the functions described below. Resource provisioning (1462) provides dynamic procurement of computing resources and other resources that are utilized to perform tasks within the cloud computing environment.

Metering and Pricing (1464) provide cost tracking as resources are utilized within the cloud computing environment, and billing or invoicing for consumption of these resources. In one example, these resources may comprise application software licenses. Security provides identity verification for cloud consumers and tasks, as well as protection for data and other resources.

User portal (1466) provides access to the cloud computing environment for consumers and system administrators. Service level management (1468) provides cloud computing resource allocation and management such that required service levels are met. Service Level Agreement (SLA) planning and fulfillment (1470) provide pre-arrangement for, and procurement of, cloud computing resources for which a future requirement is anticipated in accordance with an SLA.

Workloads layer (1480) provides examples of functionality for which the cloud computing environment may be utilized. Examples of workloads and functions which may be provided from this layer include: mapping and navigation (1482); software development and lifecycle management (1484); virtual classroom education delivery (1486); data analytics processing (1488); transaction processing (1490); and garbage collection processing of one or more aspects of the present invention (1492).

Various embodiments of the invention may be employed as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term "module" refers to an application specific integrated circuit (ASIC), an electronic circuit, an electronic computer processor (shared, dedicated, or group) and memory that executes one or more software or firmware programs, a combinational logic circuit, a microcontroller and/or other suitable components that provide the described functionality. When implemented in software, a module can be embodied in memory as a non-transitory machine-readable storage medium readable by a processing circuit and storing instructions for execution by the processing circuit for performing a method.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system configured to perform a garbage collection process within a computing environment, the computer system comprising:
   a memory including a load-monitored region managed by a runtime environment; and
   a computer processor in communication with the memory, the computer processor configured to perform operations including:
   executing an instruction to load a doubleword, the instruction itself indicating a writable destination register field;
   conditionally loading, into the destination register indicated by the instruction, different bit values based on a pointing location of a pointer, the conditional loading including one of loading an address of the pointer defining the first bit value when the pointer indicated by the instruction points to a first location located in the load-monitored region, or loading the pointer itself defining the second bit value when the pointer indicated by the instruction points to a second location located outside of the load-monitored region;
   invoking a garbage collection event-based branch (EBB) in response to loading the pointer address into the destination register field of the instruction itself, and
   in response to invoking the garbage collection EBB, moving an object indicated by the pointer with a handler from the first location to a second location in the memory that is located outside of the load-monitored region.

2. The system of claim 1, wherein the handler determines the pointer address in response to reading the pointer address directly from the destination register field of the instruction without using a source address to calculate the pointer address.

3. The system of claim 2, wherein the handler overwrites the destination register field of the instruction with a new object address corresponding to the second location in memory.

4. The system of claim 3, wherein the garbage collection EBB is exited after overwriting the destination register field of the instruction and the instruction is re-executed based on the new object address.

5. The system of claim 4, wherein the instruction is a load doubleword instruction monitored with an address indexed x-form (ldmax) instruction, the ldmax instruction including a destination field (DT) specifying a destination register field of the instruction configured to store the pointer or the pointer address, a first field (RA) specifying a first register used by a load operation of the ldmax instruction, and a second field (RB) specifying a second register used by the load operation of the ldmax instruction.

6. The system of claim 5, wherein the pointer address is based on first data loaded in the first register and second data loaded in the second register.

7. The system of claim 2, wherein the pointer is loaded into the destination register field of the instruction without invoking the garbage collection EBB in response to the pointer indicated by the instruction pointing to a second location located outside of the load-monitored region.

8. A method of managing a memory unit, the method comprising:
    designating a load-monitored region in the memory unit;
    executing an instruction to load a doubleword, the instruction itself indicating a writable destination register field;
    conditionally loading into the destination register indicated by the instruction different bit values based on a pointing location of a pointer, the conditional loading including one of loading an address of the pointer defining the first bit value when the pointer indicated by the instruction points to a first location located in the load-monitored region, or loading the pointer itself defining the second bit value when the pointer indicated by the instruction points to a second location located outside of the load-monitored region; and
    in response to invoking the garbage collection EBB, moving an object indicated by the pointer with a handler from the first location to a second location in the memory that is located outside of the load-monitored region.

9. The method of claim 8, further comprising determining the pointer address in response to reading the pointer address directly from the destination register field of the instruction without using a source address to calculate the pointer address.

10. The method of claim 9, further comprising overwriting the destination register field of the instruction with a new object address corresponding to the second location in memory.

11. The method of claim 10, further comprising exiting the garbage collection EBB after overwriting the destination register field of the instruction and reexecuting the instruction based on the new object address.

12. The method of claim 11, wherein the instruction is a load doubleword instruction monitored with an address indexed x-form (ldmax) instruction, the ldmax instruction including a destination field (DT) specifying a destination register field of the instruction configured to store the pointer or the pointer address, a first field (RA) specifying a first register used by a load operation of the ldmax instruction, and a second field (RB) specifying a second register used by the load operation of the ldmax instruction.

13. The method of claim 12, further comprising determining the pointer address based on first data loaded in the first register and second data loaded in the second register.

14. The method of claim 9, further comprising loading the pointer into the destination register field of the instruction itself without invoking the garbage collection EBB in response to the pointer indicated by the instruction pointing to a second location located outside of the load-monitored region.

15. A computer program product to manage a memory unit, the computer program product comprising a non-transitory computer readable storage medium having program instructions embodied therewith, the program instructions executable by an electronic computer processor to perform operations comprising:
    designating a load-monitored region in the memory unit;
    executing an instruction to load a doubleword, the instruction indicating a destination register field of the instruction itself;
    conditionally loading into the destination register indicated by the instruction different bit values based on a pointing location of a pointer, the conditional loading including one of loading an address of the pointer defining the first bit value when the pointer indicated by the instruction points to a first location located in the load-monitored region, or loading the pointer itself defining the second bit value when the pointer indicated by the instruction points to a second location located outside of the load-monitored region; and
    in response to invoking the garbage collection EBB, moving an object indicated by the pointer with a handler from the first location in the memory to a second location in the memory that is located outside of the load-monitored region.

16. The computer program product of claim 15, wherein the operations further comprise determining the pointer address in response to reading the pointer address directly from the destination register field of the instruction without using a source address to calculate the pointer address.

17. The computer program product of claim 16, further comprising overwriting the destination register field of the instruction with a new object address corresponding to the second location in memory.

18. The computer program product of claim 17, further comprising exiting the garbage collection EBB after overwriting the destination register field of the instruction and reexecuting the instruction based on the new object address.

19. The computer program product of claim 18, wherein the instruction is a load doubleword instruction monitored with an address indexed x-form (ldmax) instruction, the ldmax instruction including a destination field (DT) specifying a destination register field of the instruction configured to store the pointer or the pointer address, a first field (RA) specifying a first register used by a load operation of the ldmax instruction, and a second field (RB) specifying a second register used by the load operation of the ldmax instruction.

20. The computer program product of claim 16, further comprising loading the pointer into the destination register field of the instruction without invoking the garbage collection EBB in response to the pointer indicated by the instruction pointing to a second location located outside of the load-monitored region.

* * * * *